United States Patent Office

3,472,737
Patented Oct. 14, 1969

3,472,737
METHOD OF MAKING CEREAL MALT
Sanae Tahara, Kamakura-shi, Japan, assignor to Asahi Breweries Ltd., Tokyo, Japan
No Drawing. Filed Sept. 17, 1965, Ser. No. 488,273
Int. Cl. C12c 1/00
U.S. Cl. 195—69                              10 Claims

ABSTRACT OF THE DISCLOSURE

A method of making cereal malt without germination, by soaking barley grains in an ammonia solution having a predetermined ammonia concentration to thereby deprive the embryos of said barley grains of the energy to develop both acrospire and rootlet while retaining the endosperms in sound condition, and thereafter treating the resulting barley grains with gibberellin.

---

The present invention relates to a method of producing cereal malt by depriving the cereal grain of its energy to develop both acrospire and rootlet without mechanically de-embryonating the cereal grain.

The term "cereal grain" is intended to mean a grain of barley, rye, wheat, oats or other cereals. For the sake of convenience, however, the term "cereal" will be taken as represented by barley in the following discussion.

Usually, malt has been prepared by first soaking barley grains, or less commonly wheat grains, in water, allowing them to germinate and to grow for four to twelve days, after which they are dried and finally rootlets are separated.

The resultant malts have been used for a number of important purposes in the field of foods for animals and humans. Of these purposes, the one which has been most important is the use of the barley malt in the brewing and distilling industries as a basic raw material.

One feature which is required of barley malt to be used as the sole or substantially the only component of the grist in brewing is that the endosperm of the grain be substantially friable or can be fully modified, since this insures that the contents of the grain becomes readily available for subsequent degradation of the contents into, for instance, fermentable sugars by the digesting of the grist with hot water. In the process of malting, substantial changes take place in many of the constituents of the grain, specifically in the cell wall, the starch and the protein. In addition, the process is accompanied by marked formation of enzymes.

The important changes which occur in the endosperm of barley during malting appear to take place only after the grain has started germination and begun to grow. The first sign of the changes which occur in the germinating grain is represented by the emergence of rootlets which break through the coleorhiza. Elongation of the acrospire commences almost simultaneously. The rootlets grow, usually, up to 4 percent by weight of the weight of the grain, while the length of the acrospire reaches ⅔ to ¾ of the length of the grain during the malting period.

During the malting process, there is also seen a marked increase in the respiratory activity of both the rootlets and the acrospire and, as a result, about 5 to 7% of the weight of the grain may be lost in the form of carbon dioxide and water during said respiration. Therefore, the rootlets, the acrospire and the respiration constitute the factors which lead to a loss of weight or eventually of the extract in the process of malting.

If, therefore, there is developed a malting process which greatly reduces or substantially eliminates one or more of such factors which cause a loss of weight, it will be significantly useful in this field from an economic point of view.

L. R. Bishop describes, in the Journal of Institute of Brewing (1944), 50, 166, the effect of preheating of the grain which results in affecting germination. According to his method, it is possible to obtain the growth of acrospire in an equal degree or even greater than that in an ordinary untreated grain without the accompanying growth of rootlets.

Similar effects have been observed with respect to the germination of grain by acid treatment during germination which is described by B. B. Stoller in U.S. Patent No. 2,698,275, 1954 and also by W. W. Luchsinger and J. G. Fleckenstein in U.S. Patent No. 3,085,945, and like effects have been noted by the use of ammonia treatment during germination; which is described in U.S. Patent 3,134,724 of L. D. Beckord, E. Grove and J. G. Fleckenstein. In these previous studies, said treatment with acid or ammonia was conducted independently or along with gibberellic acid treatment.

Although these previous studies are based on the theory that an elongated acrospire increases the respiratory activity and on the other hand decreases the weight or the amount of extract, the methods disclosed in these prior studies merely accomplish a limited reduction in the loss of malt.

Recently, H. Yomo in the Hakko Kyokaishi (1960), 18, 494, 500, 600 and 603 and L. G. Paleg in the Plant Physiology (1960), 35, 293 and 902 showed that in the presence of oxygen and in the absence of various toxic compounds, the de-embryonated grain, when treated with gibberellic acid, produced a series of enzymes and underwent full modification.

A. M. Macleod and A. S. Miller reported in the Journal of Institute of Brewing (1962), 68, 332 that gibberellic acid used together with a dissection technique stimulated the aleurone layer and resulted in the release of enzyme.

By making use of the recent scientific achievements and the advanced technology, the present inventor conducted a study to find the possibility of modifying a cereal grain directly into malt by depriving the cereal grain of its energy to develop both acrospire and rootlets. As a result, he has found that by treating the cereal grain with a diluted ammonia solution, the grain is deprived of its energy to develop both acrospire and rootless without any appreciable impairment of the function of the aleuron layer surrounding the endosperm, and also that by treating with giberellic acid a function similar to that of the sound endosperm of the germinating barly grain in the normal malting process is retained. The inventor has found as a result of his study that the cereal grain which has been given the following treatments, i.e. a treatment to substantially deprive the cereal grain of its energy to develop both acrospire and rootlet by steeping said grain in a diluted ammonia solution; another treatment in which the grain is subjected to gibberellin; and still another treatment wherein the grain is subjected to the malting process, can produce a series of hydrolyzing enzymes and also is fully modified. In other words, it has been found as a result of this study that the cereal grain which has been given the aforesaid treatments no longer requires any growth of both the acrospire and the rootlet at the time when the grain is subjected to the malting process. Therefore, the malting process will give the theoretically highest yield of malt from cereal grains. The present invention is based upon this finding. This, he believes, is an amazing discovery.

The inventor has found as a result of his study that a cereal grain which has been given such treatment or treatments no longer require any energy for the growth of rootlets and acrospire at the time when the grain is in the malting process, and that is needs only a very small supply of water in malting as compared with the conventional methods. The present invention is based upon this finding.

A first object of the present invention, therefore, lies in providing a method of converting substantially all of the useful constituents of the endosperm of a cereal grain into a useful constituent of malt by depriving the cereal grain of its energy to develop both acrospire and rootlets.

A second object of the present invention is in reducing the length of time required for the production of cereal malt by such means as mentioned above.

A third object resides, as may be understood from the foregoing two objects, in reducing the cost of malting and in increasing the yield of malt per unit quantity or weight of grains.

A fourth object is directed to simplifying the malt manufacture processes and in providing a method which is convenient for the accomplishment of the third object.

Another object is to produce cereal malt which is never inferior but even superior in quality to conventional malts while increasing the yield of such malt and reducing the cost thereof.

Still another object is directed to the production of barely malt which satisfies the preceding objects.

Other objects and advantages will be readily understood from the following detailed description.

The inventor attempted to deprive a cereal grain of its energy to develop both acrospire and rootlet, especially of barely and to vivify only the function of the aleuron layer by treating the grain in an ammonia solution. As a result, he found that his objective could be substantially attained when the ammonia solution had a concentration in the range of the from 0.02 to 0.5% by weight of ammonia per 100 ml., although depending somewhat on the duration of the treatment. The range of concentration of ammonia solution could be 0.02–0.5%, but preferably was in the vicinity of 0.3%. The duration of treatment varied depending on the concentration of the ammonia solution, but it was in a range of 2 to 24 hours, and preferably in a range of 4 to 8 hours. Also, the treatment temperature was found to somewhat affect the treatment. In general, the temperature range was 5 to 40° C., and preferably was 10 to 25° C. The cereal grains are steeped in an ammonia solution during the steeping period, i.e., before steep-out. This treatment with ammonia may be conducted immediately before the cereal grain starts its growth of acrospire and rootlets after being washed and steeped in water; or a cereal grain (including such grain which is in a state in which a tiny coleorhiza visible) may be directly treated with ammonia without going through such steps as mentioned above. Whichever type of treatment is effected, there is no substantial difference in the duration of treatment. It is mandatory, however, for both of said treatments that the grain be washed before the grain is subjected to gibberellic acid. The following description of the results of experiments conducted by the inventor will demonstrate to what extent the cereal grains are deprived of their energy to develop both acrospire and rootlets by the ammonia treatment.

Experiment:

The experiment consisted of observing the germinating rate of barley grain directly immersed in ammonia solution as compared with the rate when the grain was treated with ammonia after being soaked in water for 10 hours and by varying the concentration of the ammonia solution, the steeping temperature and the duration of steeping. Table 1 shows the percent germination of the barley grain when the grain is directly immersed in ammonia solution. Table 2 shows the result where the grain is first steeped in water and then treated in ammonia solution. The aqueous ammonia mentioned in said tables is of a concentration of 28%.

TABLE 1

| Concentration duration steeping temperature | 0.5 ml. of aqueous ammonia/in 100 ml. of water | | | 1 ml. of aqueous ammonia/in 100 ml. of water | | |
|---|---|---|---|---|---|---|
| | 2 hrs. | 4 hrs. | 6 hrs. | 2 hrs. | 4 hrs. | 6 hrs. |
| 10° C | 100% | 0.1% | 0% | 0.02% | 0% | 0% |
| 20° C | 20% | 0% | 0% | 0% | 0% | 0% |

TABLE 2

| Concentration duration steeping temperature | 1 ml. of aqueous ammonia/in 100 ml. of water | | | | |
|---|---|---|---|---|---|
| | 1 hr. | 2 hrs. | 3 hrs. | 4 hrs. | 6 hrs. |
| 20° C | 93% | 59% | 12% | 0% | 0% |

According to the present invention, the cereal grain which has been substantially deprived of its energy to develop both acrospire and rootlet is thoroughly washed before being further treated with gibberellin. The gibberellin herein referred to is a compound such as lactone and its derivatives having a saturated tetracarbocyclic gibban ring and having a biological function similar to gibberellin $A_3$. The gibberellin treatment which is performed on the barely after treatment in the ammonia solution may be effected by fine sprays or in some cases by immersing the grain in gibberellin solution for only a limited length of time. The concentration of gibberellin may be in the range of 0.02 p.p.m. to 5 p.p.m., but the preferred range is 0.2 p.p.m. to 1 p.p.m. The quantity of the gibberellin solution used for this purpose may be 10 to 100% by weight, and preferably 40 to 60%, of the weight of the cereal grain.

In preparing cereal malt, in general, it has been the usual practice to moisten the cereal grain so that it is able to supply the water required for the growth of acrospire and rootlets. In such a case, moisture is absorbed by the grain and therefore the moisture content of the grain rises to 43–45%. As stated above, water is required for the growth of acrospire and rootlets. But the water consumption is particularly great at the root portion. On the other hand, however, the moisture content in the endosperm does not show as great an increase as in the root portion. Experiments conducted by the invention show that when a cereal grain is treated first in an ammonia solution and then with gibberellin and thereafter subjected to highly humidified air currents, the moisture content of the endosperm increases and hampers normal modification. In such a case, the cereal grain is excessively modified. The term "excessively modified" grain implies that the cereal malt which, when mashed in water, decomposes and the resulting solution is a dark color while in addition, the conversion of starch and the nitrogenous compounds contained in the endosperm is carried out in a pattern different from that observed in normal cereal malting.

By taking these facts into consideration, the inventor has malted cereal grain which had been treated first with ammonia and then with gibberellin by keeping the water content of the grain at a level lower than that required for making ordinary cereal malt. The result is that a cereal malt is obtained which is never inferior but is even superior in quality to conventional malts. The water content which led to this success was in the range of 38–42%, and the preferred range was in the vicinity of 40%. This achievement provides an advantage in the industrial preparation of malt, in that the supply of humidified air currents during the malting process may be eliminated, and this is particularly desirable from a viewpoint of economy. Depending upon the conditions under which malting is carried out, however, a limited amount of moist aeration or exhaustion of air was conducted. The time required for the preparation of malt was substantially equal to that for the conventional methods, and more specifically, it took about 4 to 8 days.

According to the present invention, the malt is prepared by substantially depriving the cereal grain of its energy to develop both acrospire and rootlet, and therefore it minimizes the loss of energy to such an extent that 96% or more of the effective constituents of the grain may be modified into malt. This means that the yield is increased almost to the maximum as compared with the conventional methods. In addition, as is clear from the foregoing, the entire process of malting is greatly simplified and this is important from an economic point of view.

The cereal malt after the grain has been sufficiently modified may be used as a final product without any further treatment, or by slightly injuring or acting on the grain with an external pressure and then drying it. Where there is no need of drying, the malt may be directly used for brewing and other purposes. The term "injuring" means breaking the pericarp, testa and husk surrounding the endosperm by piercing them or by tapping or applying mechanical force to the grain externally.

The advantages of the present invention will become more clearly understood by reference to the following examples.

Example 1

20 kg. of Australian barley were placed in water to remove such grains which float to the surface of water. Then the barley was washed thoroughly. After 10 hours, the barley was soaked in 0.28% ammonia solution for 5 hours, and then rinsed thoroughly. When the moisture content of the barley reached 38%, the barley was subjected to fine sprays of 1 p.p.m. gibberellin in an amount of 50% by weight of the initial weight of the barley, after which, the barley was divided into two samples. One of the samples was transferred to a conventional germination bed, passing through humidified air currents having a temperature of between 16 to 18° C. The other sample was made to inspire air to a very limited extent in a chamber with a humidity of 80%. At the end of the 6th day, these two samples were dried by a conventional one floored kiln drying method. However, the second sample was further divided into two sub-samples before they were dried. One of the subsamples was dried without any further treatment, but the other subsample was slightly injured before it was dried. The result obtained from these samples is shown in the following Table 3.

TABLE 3.—ANALYSIS OF MALTS
[According to Analytica-E.B.C.]

| | Fully modified barley grain | | | Conv. malt |
|---|---|---|---|---|
| Modified | With gibberellin and without germination under humidified air currents. | With gibberellin and without germination under slight aeration by keeping water content of grain at 38–40%. | With gibberellin and without germination under slight aeration by keeping water content of grain at 38–40%. | With germination under humidified air current. |
| Kiln | Direct drying | Direct drying | Dried after injuring grain | Direct drying. |
| Mechanical analysis, Acrospire length, Mean. | 0.25 (No elongation) | 0.25 (No elongation) | 0.25 (No elongation) | 0.75 (Elongated). |
| Mealiness and Steeliness: | | | | |
| Mealy, percent | 95.5 | 94.0 | 98.0 | 94.0. |
| Half steely, percent | 2.5 | 6.0 | 2.0 | 3.5. |
| Steely, percent | 2.0 | 0 | 0 | 2.5. |
| Chemical analysis: | | | | |
| Moisture content, percent | 4.5 | 4.5 | 4.2 | 4.2. |
| Extract yield on dry grain, percent. | 79.7 | 79.2 | 79.9 | 79.4. |
| Saccharification time, minutes. | 10–15 | 10–15 | 10–15 | 25–30. |
| Odor of mash | Foreign odor | Normal | Normal | Normal. |
| Speed of filtration | Normal | do | do | Do. |
| Clarity of wort | Cloudy | Opalescent | Opalescent | Opalescent. |
| Wort color in E.B.C. units | 6.0 | 4.0 | 3.0 | 3.2. |
| N-content (on dry grain), percent. | 1.7 | 1.7 | 1.7 | 1.7. |
| Soluble nitrogen (on dry grain), percent. | 0.807 | 0.674 | 0.652 | 0.600. |
| Kolbach index, percent | 47.4 | 39.6 | 38.3 | 36.1. |
| Yield from 100 kg. of barley (dry matter): | | | | |
| Modified grain or malt, kilograms. | 96 | 96 | | 89. |
| Rootlets, kilograms | 0 | 0 | | 3.8. |

Example 2

20 kg. of Australian barley different than that used in Example 1 where soaked in water and the barley grains which floated to the water surface were removed, and the remainder was washed. After 10 hours the barley was immersed in a 0.28% ammonia solution for 6 hours. After the immersion, the barley was washed thoroughly and was divided into two samples. One of the samples was washed immediately while the other sample was soaked in a 0.05% sulfuric acid solution for 6 hours thereby whitening the color of the barley before it was washed. Next, each of these samples was subjected to fine sprays of 0.3 p.p.m. gibberellin solution of which the gibberellin amount was equivalent to one half of the initial weight of the barley. Then, both samples were maintained at a moisture content of between 38 and 40% while ventilating the air to a limited degree in a chamber. At the end of the 6th day, they were dried by the conventional one floored kiln drying method similar to Example 1. The following table shows the analysis of the obtained malts.

TABLE 4.—ANALYSIS OF MALTS
[According to Analytica-E.B.C.]

| | Fully modified barley grain | | Conventional |
|---|---|---|---|
| Steeped | First in water, next in NH$_3$ solution, and washed out. | First in water, next in NH$_3$, then in H$_2$SO$_4$ solutions and washed out. | In water only. |
| Modified | By gibberellin without germination, with slight aeration, keeping water content of grain at 38–40%. | By gibberellin without germination, with slight aeration, keeping water content of grain at 38–40%. | By germination technique and passing humidified air. |
| Kiln | Direct drying | Direct drying | Direct drying. |
| Mechanical analysis, Acrospire length, Mean | 0.25 (No elongation) | 0.25 (No elongation) | 0.75 (Elongated). |
| Mealiness and Steeliness: | | | |
|   Mealy, percent | 96.0 | 96.0 | 96.0. |
|   Half steely, percent | 3.5 | 3.0 | 2.5. |
|   Steely, percent | 0.5 | 1.0 | 1.5. |
| Chemical analysis, Moisture content, percent | 4.8 | 4.8 | 4.0. |
| Extract yield on dry grain, percent | 76.6 | 76.6 | 77.4. |
| Saccharification time, minutes | 10–15 | Under 10 | 10–15. |
| Odor of mash | Normal | Normal | Normal. |
| Speed of filtration | do | do | Do. |
| Clarity of wort | Opalescent | Opalescent | Opalescent. |
| Wort color in E.B.C. units | 3.4 | 3.4 | 3.2. |
| N-content on dry grain, percent | 1.9 | 1.9 | 1.8. |
| Soluble nitrogen on dry grain, percent | 0.621 | 0.612 | 0.664. |
| Kolbach Index | 32.7 | 32.2 | 36.9. |
| Yield from 100 kg. of barley (dry matter): | | | |
|   Modified grain or malt, kilograms | 96 | 96 | 89. |
|   Rootlets, kilograms | 0 | 0 | 3.8. |

The fact that the present invention provides an effect incomparably superior to the conventional methods should now be understood readily from the foregoing examples without requiring any further discussion.

What is claimed is:

1. A method of making cereal malt comprising: soaking the cereal grain in water to an extent such that insubstantial growth of acrospires and rootlets results, then immersing the cereal grain in a diluted ammonia solution to substantially deprive the cereal grain of its energy to develop both acrospires and rootlets, thereafter thoroughly washing said cereal grain, then subjecting the grain to gibberellin and thereafter subjecting said grain to malting processes wherein the moisture content of the grain during said malting processes is maintained in the range of 38–42%.

2. A method of making cereal malt as claimed in claim 1 wherein the concentration of the diluted ammonia solution is in the range of 0.02–0.5% by weight of ammonia per 100 ml.

3. A method of making cereal malt as claimed in claim 1 wherein the concentration of the gibberellin used for treatment is in the range of 0.02 p.p.m. to 5 p.p.m. and the quantity of said gibberellin is in the range of 10 to 100% by weight of the weight of the cereal grain.

4. A method of making cereal malt as claimed in claim 1 wherein the cereal grain is barley.

5. A method of making cereal malt comprising: soaking the cereal grain in water to an extent such that insubstantial growth of acrospires and rootlets results, then immersing the cereal grain in a diluted ammonia solution to substantially deprive the cereal grain of its energy to develop both acrospires and rootlets, then thereafter thoroughly washing said cereal grain, then subjecting the resulting grain to gibberellin, and thereafter subjecting the grain to malting processes wherein the moisture content of the grain during said malting processes is maintained in the range of 38–42% and then drying the resulting grain.

6. A method of making cereal malt as claimed in claim 5 wherein the concentration of the diluted ammonia solution is in the range of 0.02–0.5% by weight of ammonia per 100 ml.

7. A method of making cereal malt as claimed in claim 5 wherein the concentration of the gibberellin used for treatment is in the range of 0.02 p.p.m. to 5 p.p.m. and the quantity of said gibberellin is in the range of 10 to 100% by weight of the weight of the cereal grain.

8. A method of making cereal malt as claimed in claim 5 wherein the cereal grain is barley.

9. A method of making cereal malt as claimed in claim 5 comprising applying external force on the resulting grain to injure the same prior to drying.

10. A method of making cereal malt, said method comprising soaking a cereal grain in water for a period of time such that only insubstantial growth of acrospires and rootlets occurs, then treating the grain with an aqueous ammonia solution having a concentration of 0.02 to 0.5% by weight of ammonia per 100 ml. for a period of 2 to 24 hours at a temperature of 5° to 40° C. to substantially deprive the cereal grain of its energy to develop both acrospires and rootlets, thereafter thoroughly washing said cereal grain, then subjecting the cereal grain to treatment with 0.02 to 5 p.p.m. of gibberellin, thereafter subjecting the cereal grain to malting processes wherein the moisture content of the grain during said malting processes is maintained in the range of 38–42%, then injuring the grain by applying an external force thereto and finally drying the same.

References Cited

UNITED STATES PATENTS

| | | | |
|---|---|---|---|
| 3,085,945 | 4/1963 | Luchsinger et al. | 195—71 |
| 3,134,724 | 5/1964 | Beckord et al. | 195—70 |
| 3,159,551 | 12/1964 | Sandegren et al. | 195—71 |
| 3,174,909 | 3/1965 | Beckord et al. | 99—50 |

A. LOUIS MONACELL, Primary Examiner

NORMAN ROSKIN, Assistant Examiner

U.S. Cl. X.R.

195—70